(12) United States Patent
Logan et al.

(10) Patent No.: US 8,547,681 B2
(45) Date of Patent: Oct. 1, 2013

(54) DECOUPLING CAPACITOR

(75) Inventors: Shawn M. Logan, Andover, MA (US); Ellis E. Nease, Kutztown, PA (US)

(73) Assignee: LSI Corporation, Milpitas, CA (US)

( * ) Notice: Subject to any disclaimer, the term of this patent is extended or adjusted under 35 U.S.C. 154(b) by 269 days.

(21) Appl. No.: 13/032,429

(22) Filed: Feb. 22, 2011

(65) Prior Publication Data
US 2012/0212878 A1    Aug. 23, 2012

(51) Int. Cl.
*H01G 4/228* (2006.01)
(52) U.S. Cl.
USPC ............... 361/306.2; 361/306.1; 361/301.2; 361/301.4; 361/303; 361/305
(58) Field of Classification Search
USPC ..... 361/306.2, 306.1, 301.2, 301.4, 303–305, 361/311–313
See application file for complete search history.

(56) References Cited

U.S. PATENT DOCUMENTS

| | | | |
|---|---|---|---|
| 7,022,581 B2 | 4/2006 | Harris et al. | |
| 7,557,426 B2 | 7/2009 | Baumgartner et al. | |
| 8,039,922 B2 * | 10/2011 | Ni | 257/532 |

* cited by examiner

*Primary Examiner* — Nguyen T Ha
(74) *Attorney, Agent, or Firm* — Hitt Gaines, PC (57) ABSTRACT

An electronic device package includes first and second electrodes of a package substrate. The first electrode has fingers formed from a first metal level and is configured to operate at a first DC potential. The second electrode has fingers formed from the first metal level interdigitated with the fingers of the first electrode. A via conductively connects the second electrode to a second metal level. The second metal level is configured to operate at a second DC potential. The first and second DC potentials are thereby capacitively coupled through the interdigitated electrodes.

20 Claims, 6 Drawing Sheets

FIG. 8

DECOUPLING CAPACITOR

TECHNICAL FIELD

This application is directed, in general, to an electronic device package, a method of forming an electronic device package, and a library of standard logic elements for use in an electronic device package.

BACKGROUND

A significant consideration when designing many electronic circuits is the need to provide a low impedance power supply and ground node. In effect, as the current drawn by devices within the circuit varies with time, the actual supply and ground voltages seen by the circuit are determined by the current drawn from the supply and ground nodes and their respective impedances. As such, if the impedances are maintained low enough, the power supply and ground nodes may approach their ideal DC values even with the variation of supply and ground current, and the circuit may operate as desired.

With the advent of dense integrated circuits and the packages and circuit boards that support them, numerous undesired impedances appear in the supply and ground nodes. In addition, higher switching speeds of CMOS circuits result in significantly greater supply and ground transient currents than prior technologies. Hence, to establish the desired impedance at a supply or ground node, capacitors are typically placed at strategic points on an integrated circuit and/or within the integrated circuit package and/or on the circuit board such that the high frequency impedance of the supply and ground nodes is reduced to an acceptable level. These capacitors are often referred to as decoupling or bypass capacitors.

While known decoupling capacitors may reduce power supply voltage transients, new decoupling strategies are needed to meet the needs of current and future highly demanding integrated circuit designs.

SUMMARY

One aspect provides an electronic device package. The electronic device package includes first and second electrodes of a package substrate. The first electrode has fingers formed from a first metal level and is configured to operate at a first DC potential. The second electrode has fingers formed from the first metal level interdigitated with the fingers of the first electrode. A via conductively connects the second electrode to a second metal level. The second metal level is configured to provide a second DC potential to the second electrode. The first and second DC potentials are thereby capacitively coupled through the interdigitated electrodes.

Another aspect provides a method of decoupling power on an electronic device package. The method includes forming first and second electrodes of a package substrate. The first electrode has fingers formed from a first metal level, and is configured to provide a first DC potential. The second electrode has fingers formed from the first metal level interdigitated with the fingers of the first electrode. The second electrode is connected to a second metal level. The second metal level is configured to provide a second DC potential to the second electrode. The first and second DC potentials are thereby capacitively coupling through the interdigitated electrodes.

Yet another aspect provides a library of standard elements for use in an electronic device package substrate. The library includes a standard element corresponding to a decoupling capacitor. The standard element provides first and second electrodes. The first electrode is configured to operate at a first DC potential, and has fingers formed from a first metal level. The second electrode has fingers formed from the first metal level interdigitated with the fingers of the first electrode. The standard element further provides a via that conductively connects the second electrode to a second metal level configured to provide a second DC potential.

BRIEF DESCRIPTION

Reference is now made to the following descriptions taken in conjunction with the accompanying drawings, in which.

DETAILED DESCRIPTION

Known conventional solutions typically place discrete surface mount device (SMD) capacitors on a device package substrate to provide high-frequency power supply decoupling between a ground plane and one or more power planes. SMD capacitors typically include two rectangular metalized pads on the SMD package to provide electrical and mechanical connection to the substrate. Connection pads on the substrate circuit board correspond to the SMD pads, and must be accommodated in the package interconnect layout. Typically the SMD capacitor is placed as closed as possible to the power and ground nodes to minimize impedance between the nodes and the power and ground planes.

However, this conventional practice suffers from several disadvantages. First, the signal routing on the package substrate is typically most dense near the integrated circuit. Therefore the signal routing is frequently disrupted by the SMD pad placement in these high-density areas. Secondly, there are also physical constraints to forming both wire bond packages (e.g. wire throw) and flip chip packages (e.g. underfill bleed-out) that may force these SMD capacitors to be placed some distance away from the integrated circuit, reducing their effectiveness. Thirdly, there are additional product costs associated with adding the SMD capacitors to the package due to their component cost, temperature requirements for assembly, and additional steps of the manufacturing process required for assembly. Finally, multilayer SMD capacitors, which are the least expensive surface-mount capacitors, have an integral series inductance due to the nature of their design. Hence, their high frequency impedance is greater, which reduces their ability to lower power supply or ground node impedance.

The inventors have recognized the aforementioned limitations of conventional practice may be substantially reduced or ameliorated by replacing the package SMD capacitors with comb, or interdigitated, capacitors formed within the package substrate. Elements of the interdigitated capacitors are connected between a power plane and a ground plane of the package substrate. The interdigitated capacitors may be formed in locations on the package substrate that are not otherwise dedicated to signal interconnects. The capacitors may further be placed closer to a point at which power and ground are routed between the package substrate a circuit board on which the package substrate is mounted, or between the package substrate and an integrated circuit die mounted thereto. In this way high-frequency decoupling may be provided more compactly, at lower cost, and closer to the need than in conventional practice.

The benefit of providing interdigitated decoupling capacitors in an electronic device package substrate has been heretofore unrecognized. Parallel plate capacitors, such as gate capacitors, have been used as integrated circuit substrate decoupling capacitors. In that application, the gate dielectric is typically thin enough and of high enough quality that such decoupling capacitors provide a useful capacitance with tolerable impact on device reliability. However, parallel plate capacitors have not been found to be suitable for use in production device package substrates. Among the reasons for their unsuitability, the distance between metal layers in such substrates is typically too large, and dielectric permittivity of the intervening dielectric too small, to provide a large enough capacitance without consuming too much space in the substrate layout.

On the other hand, interdigitated capacitors have not been found to be suitable for decoupling power levels in IC die designs. IC interconnect technology typically attempts to minimize capacitive coupling between interconnect lines by reducing the thickness of metal lines and using dielectric materials with a relatively low dielectric permittivity. Thus there is insufficient coupling between interdigitated electrodes to provide sufficient capacitance in a small capacitor.

The inventors have recognized that the limitations of interdigitated decoupling capacitors may be overcome in the context of electronic device substrate design. As described below, metal lines may be formed with sufficient thickness and small enough spacing that interdigitated capacitors may be formed with sufficient capacitance per unit area to effectively suppress voltage transients on power and ground planes within the package substrate.

While interdigitated capacitors on or embedded in a package substrate may have a lower capacitance than, for example, a discrete ceramic capacitor, they may fill an important design niche. In some applications where a large source of local charge is required on the power supply node (such as circuits that cycle rapidly between a power-on and a power-off state), the use of a low frequency discrete capacitor within a package is typically desirable. However, in many integrated circuits, a lower value, high quality capacitor may be valuable to supplement any on-die bypass capacitance to reduce the impedance of the supply node at high frequencies. Due to die area constraints, the maximum on-die bypass capacitance on some supply nodes might be as low as 10 pf and perhaps as high as 500 pf. In these applications, it may be of value to provide a library-based interdigitated capacitor embedded in or on the surface of a substrate that can be placed in multiple locations in otherwise unused areas of the package substrate. Such capacitors may provide a bypass capacitance of, for example, 10 pf or more. As a result, although the use of a low capacitance-density library element for a substrate may not in all cases be a prudent design choice as a general bypass capacitance element, its use in some applications provides a distinct cost and area savings when compared to a discrete multilayer ceramic capacitor.

Figure 1:
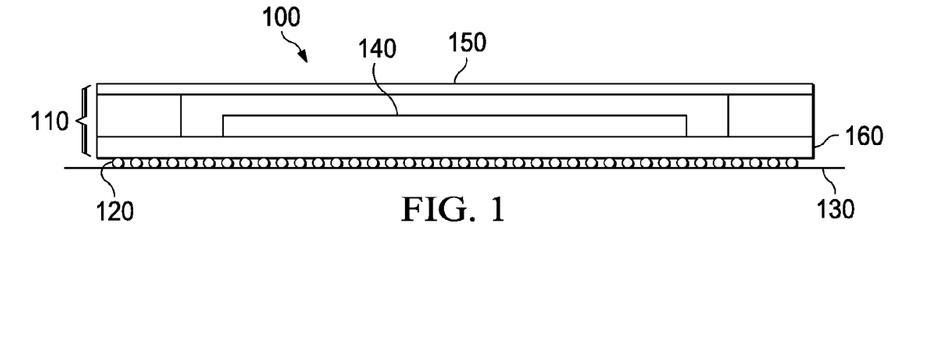
FIG. 1 illustrates an electronic device package of the disclosure, including an integrated circuit die and a package substrate.

Turning to FIG. 1, illustrated is an electronic device 100 of the disclosure. The electronic device 100 includes a device package 110. The device package 110 is illustrated without limitation as a ball-grid-array (BGA) package. Thus, solder balls 120 provide I/O connections from a substrate 130, e.g. a circuit board. Within a package cavity is a device die 140. A lid 150 encloses the cavity and covers the device die 140. The lid 150 is illustrative of various embodiments that may utilize a metal cover or a coating of some type, such as "potting" epoxy. The lid may be hermetic or non-hermetic. The lid 150 may optionally be omitted in various embodiments, e.g. in which the device package 110 is a lidless package. The device die 140 may be any type of die-level electronic device suitable for packaging, such as a semiconductor integrated circuit (IC) device. Without limitation the device die 140 may be a silicon die processed to include transistors and interconnections.

The device die 140 is located over a package substrate 160. In some embodiments the device die 140 may be a flip-chip device, in which case mechanical and electrical connections between the device die 140 and the package substrate 160 may be made via solder bumps therebetween. In other embodiments the device die 140 is attached to the package substrate 160 by adhesive, and is electrically connected thereto by wire bonds.

Figure 2:
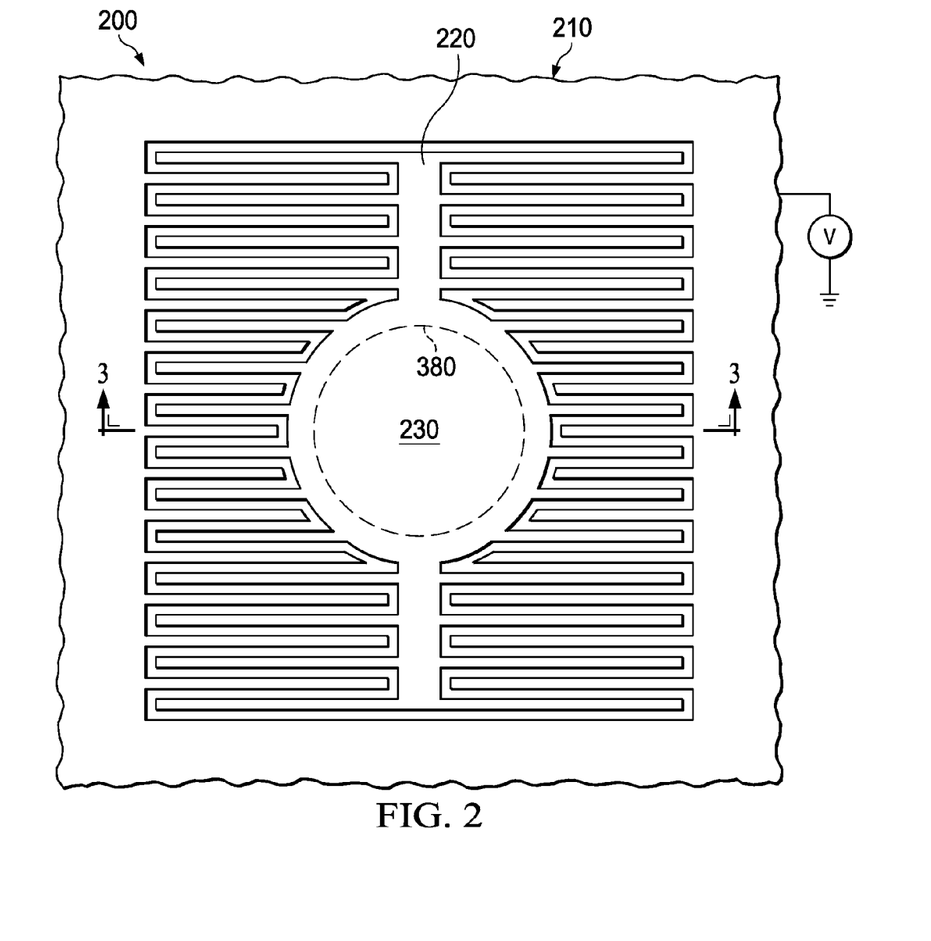
FIG. 2 illustrates an embodiment of a decoupling capacitor of the disclosure, including first and second electrodes having interdigitated fingers.
Figure 3:
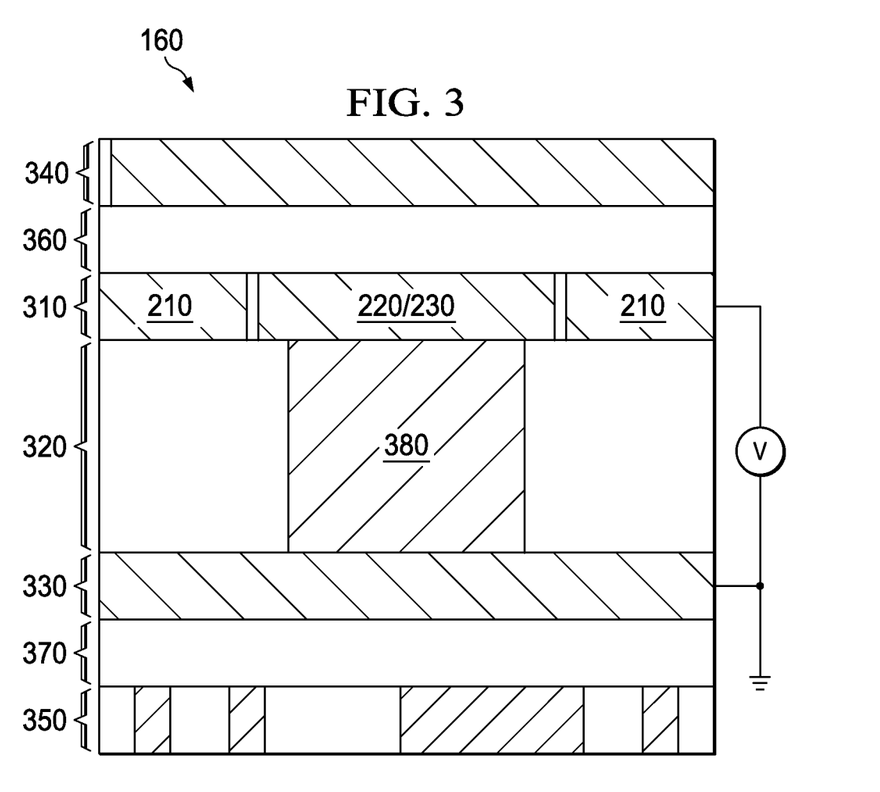
FIG. 3 illustrates a section through a portion of the decoupling capacitor of FIG. 2, the section including first and second metal levels and a via therebetween.

FIGS. 2 and 3 respectively illustrate plan and sectional views of one embodiment of an interdigitated decoupling capacitor 200. FIGS. 2 and 3 are described concurrently, and are drawn to different scales to more easily view relevant features of the decoupling capacitor 200.

The decoupling capacitor 200 includes a first electrode 210 and a second electrode 220. The electrodes 210, 220 are formed from a first metal level 310 of the package substrate 160. The metal level 310 is located over a substrate core layer 320 that provides overall mechanical support for other layers of the package substrate 160. The core layer 320 may include, e.g. a glass-epoxy dielectric laminate such as FR4 with a thickness in a range of about 400 μm to about 800 μm. The metal level 310 is not limited to any particular material, and may be copper or a copper alloy. The thickness of the metal level 310 is not limited to any particular value, and may be, e.g. about 15-20 μm.

In the illustrated embodiment the metal level 310 is a first power distribution plane, illustrated without limitation as being a power plane. The package substrate 160 includes a second metal level 330 that is configured as a second power distribution plane, illustrated without limitation as a ground plane. Being power distribution planes, the metal levels 310, 330 may remain unbroken to the extent possible to preserve a low-inductance current path to the device die 140. The second metal level 330 may, but need not, be of a same material and have a same thickness as the metal level 310. Third and fourth metal levels 340, 350 are routing metal levels that may provide signal routing within the package substrate 160. Dielectric layers 360, 370 (e.g. ~30 μm epoxy resin) respectively isolate the metal levels 340, 350 from the metal levels 310, 330.

The first electrode 210, being formed from the metal level 310, is configured to operate at a first voltage potential, e.g. V. A core via 380 connects the metal level 330 to the second electrode 220 by way of a via landing pad 230. A core via is a via that passes through the core layer 320 to connect a power or ground plane of the package substrate 160 to a capacitor electrode formed on another metal layer of the package substrate 160. The capacitor electrode may be formed on another power or ground plane or may be formed on a routing metal level. By the connection to the metal level 330 the second electrode 220 is configured to operate at a second voltage potential, e.g. ground. The metal levels 310, 330 and the voltage potentials thereon are thereby capacitively coupled through the electrodes 210, 220.

The potential V may be positive or negative with respect to ground. The potential V may be provided by a voltage source that produces a DC voltage, but is not limited thereto. Herein a DC voltage source is configured to provide a nominally constant voltage with respect to ground. Minor fluctuations, such as white noise and switching transients are not considered to be a component of the DC voltage.

The electrodes 210, 220 are comb electrodes. As such they each include fingers, with fingers of the first electrode 210 being interdigitated with fingers of the second electrode 220. Herein interdigitated means that fingers of the first electrode 210 are bordered on two sides by fingers of the second electrode 220, and fingers of the second electrode 220 are bordered on two sides by fingers of the first electrode 210.

While the metal levels 310, 330 are also capacitively coupled through the core layer 320, in many cases the spacing between the fingers of the electrode 210 and the fingers of the electrode 220 is much smaller than the thickness of the core layer 320. Thus it is expected that in most cases the capacitance between the fingers, e.g. "intralevel capacitance" will dominate capacitance between the metal levels 310, 330, e.g. "interlevel capacitance."

The package substrate 160 is not limited to any particular number of metal levels or power planes. Thus, while the package substrate 160 is illustrated as having four metal levels, embodiments of the disclosure are not limited to such. Those skilled in the pertinent art will appreciate that package substrates may include additional power routing levels and/or additional power planes.

Figure 4:
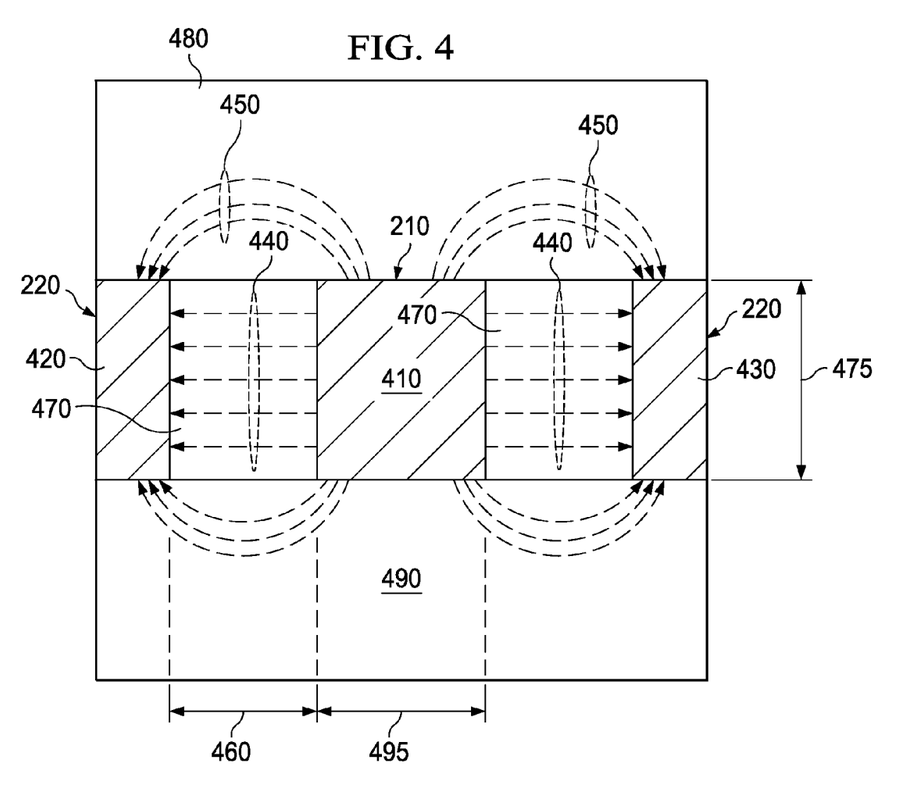
FIG. 4 illustrates aspects of a finger from one electrode of FIG. 2 and two neighboring fingers from the other electrode of FIG. 2, including capacitive coupling therebetween.

FIG. 4 illustrates a sectional view through one finger 410 that is a portion of the first electrode 210. Proximate to the finger 410 are fingers 420, 430 that are portions of the second electrode 220. It is believed that the finger 410 is capacitively coupled to the fingers 420, 430 by parallel electric field lines 440 and fringing field lines 450. The capacitance associated with the parallel electric field lines 440, referred to hereinafter as the direct capacitance, is believed to be determined predominantly by a distance 460 between the finger 410 and each of the fingers 420, 430, the dielectric permittivity of dielectric regions 470 between the finger 410 and the fingers 420, 430, and a height 475 of the electrodes 210, 220. The capacitance associated with the fringing electric field lines 450, referred to hereinafter as the fringing capacitance, is believed to be determined predominantly by the distance 460 and the dielectric permittivity of a dielectric region 480 above the fingers 410, 420, 430 and of a dielectric region 490 below the fingers 420, 430.

The dielectric permittivity of the dielectric regions 480, 490 may, but need not, be about the same. The dielectric regions 470 may be portions of the same dielectric material as the dielectric region 480. The dielectric region 480 may be a portion of the dielectric layer 360. In an example in which the dielectric permittivity of the dielectric region 480 is not about equal to that of the dielectric region 490, the dielectric region 490 may be a glass-epoxy composite such as E679FG with a dielectric permittivity of about 4.9, while the dielectric region 480 may be ABF GX3 resin with a dielectric permittivity of about 3.4.

It is expected that as the distance 460 decreases the capacitance associated with the field lines 440, 450 increases. Thus, to achieve the greatest capacitance for a given number of fingers 410, 420 the distance 460 should be as small as possible. Typically the minimum possible value will be a minimum distance allowed by design rules associated with forming the package substrate 160. In a nonlimiting example of an illustrative design rule set, the minimum distance 460 may be about 25 μm, when the height 475 is about 15 μm.

The fingers 410, 420 may be characterized by an aspect ratio (AR) computed as a dimensionless ratio of the height 475 to a width 495. For a given distance 460, as the AR increases the relative contribution of the direct capacitance increases, and the total capacitance also increases. Thus, the capacitance of the decoupling capacitor 200 may be increased without the use of additional layout area on the package substrate 160 by increasing the height 475. Therefore in some cases it may be preferable that the AR is at least about 1:1, more preferably at least about 2.5:1, and most preferably about 5:1. However, embodiments are not limited to aspect ratios of at least about 1:1. For example, the distance 460 and height 475 provided in the example above result in an AR of about 0.6.

Figure 5:
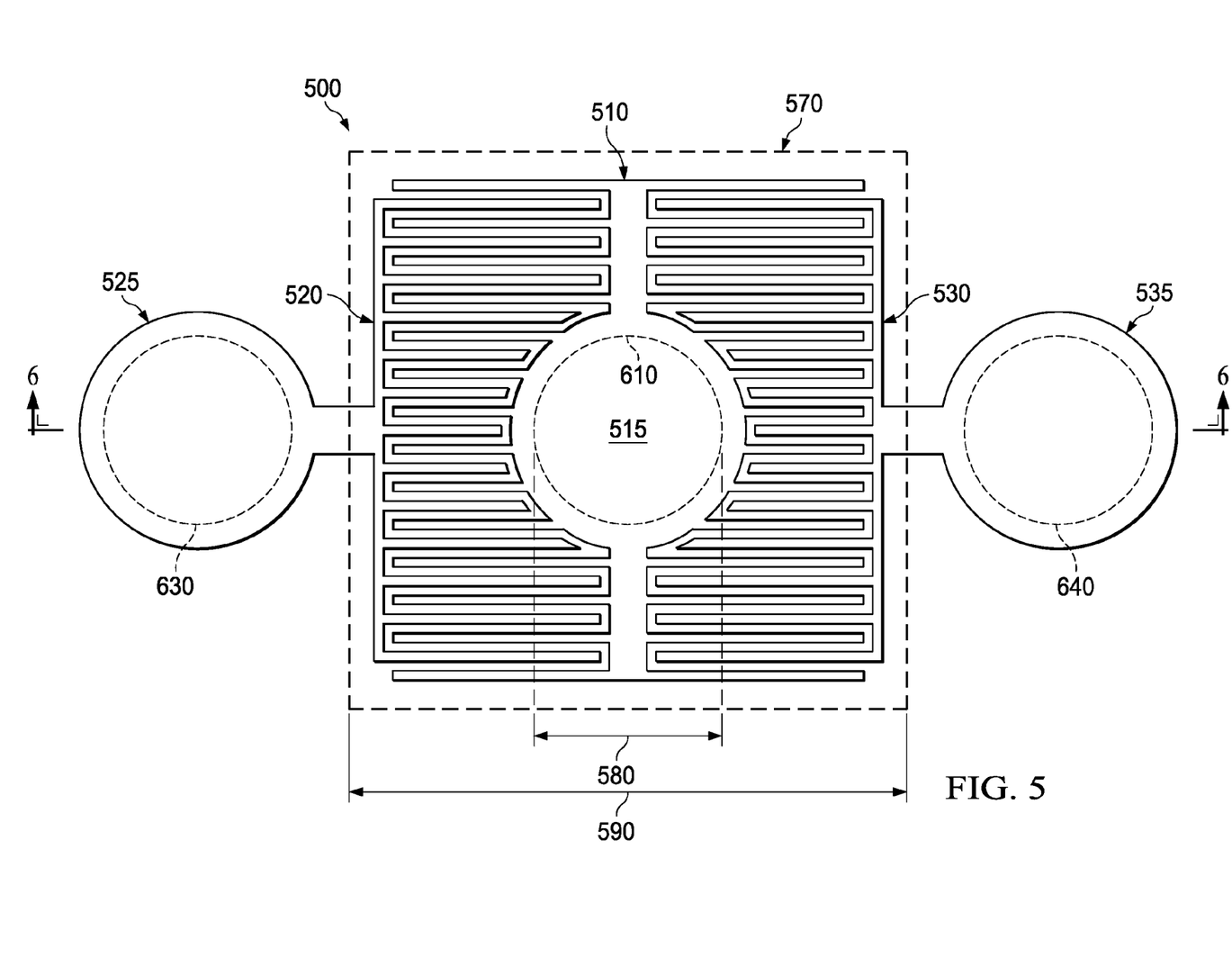
FIG. 5 illustrates another embodiment of a decoupling capacitor of the disclosure formed in a signal routing layer of the package substrate.
Figure 6:
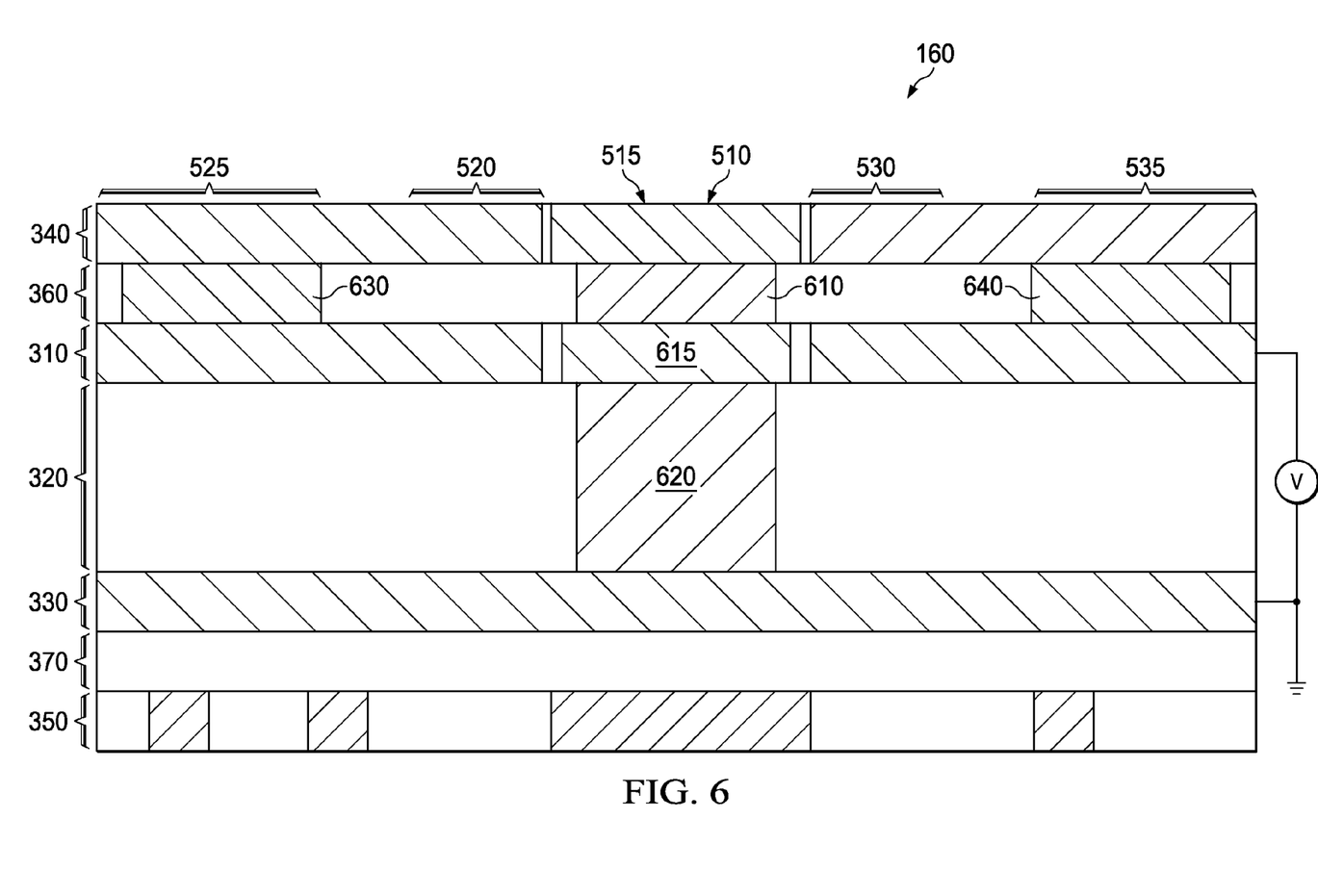
FIG. 6 illustrates a section through a portion of the decoupling capacitor of FIG. 5.

FIGS. 5 and 6 are sectional and plan views of an embodiment of a decoupling capacitor 500 that is formed in a signal routing layer of the package substrate 160. FIGS. 5 and 6 are described concurrently, and are again drawn to different scales to more easily view relevant features of the decoupling capacitor 500. In the illustrated embodiment the decoupling capacitor 500 may be formed in the metal level 340.

The decoupling capacitor 500 includes three electrodes. A first electrode 510 is interdigitated with second and third electrodes 520, 530. The first electrode 510 includes a via landing pad 515. The second and third electrodes 520, 530 respectively include via landing pads 525, 535. An interlevel via 610 connects the landing pad 515 to a landing pad 615 formed from the metal level 310. A core via 620 connects the landing pad 615 to the metal level 330. Interlevel vias 630, 640 respectively connect the landing pads 525, 535 to the metal level 310.

The interlevel vias 630, 640 are interlevel vias. As opposed to core vias, interlevel vias traverse a dielectric layer located between a power plane level and a signal routing level. For instance, the interlevel vias 630, 640 connect the metal level 310 to the electrodes 520, 530 through the dielectric layer 360. Interlevel vias are typically formed to different design rule specifications than are core vias. For example, the interlevel vias 630, 640 may have a smaller diameter that the core via 620. In some embodiments the diameter of the interlevel vias 630, 640 is between one-third and one-half of the diameter of the core via.

When the metal level 310 is connected to, e.g. a voltage potential V, and the metal level 330 is connected to, e.g. ground, the electrodes 510, 520, 530 operate to capacitively couple the voltage V to ground thereby reducing voltage transients caused by current spikes on the power and ground planes.

The decoupling capacitor 500 advantageously removes the decoupling capacitor 500 from the power and ground planes. Those skilled in the pertinent art will appreciate that a designer will generally prefer to minimize perturbations of the ground and power planes caused by cutouts and discontinuities. By moving the decoupling capacitor 500 to the metal level 340, the disturbance of the power plane (e.g. the metal level 310) is reduced to a single opening to permit the core via 620 to transit the metal level 310. This advantage is expected to be similar in cases for which the metal level 310 operates as the ground plane.

FIG. 5 also illustrates a polygon 570, e.g. a square, that circumscribes the decoupling capacitor 500. The polygon describes a maximum extent in the plane of the package substrate 160 of the decoupling capacitor 500. The maximum extent may vary with the design rules used to produce the package substrate 160 as the capacitor design is scaled. A diameter 580 of the interlevel via 610 may be used as an internal reference to describe the maximum extent of the decoupling capacitor 500. Thus, the size of the capacitor relative to other features formed on the package substrate 160 will be about the same as the features scale with different design rules.

In some embodiments a side length 590 of the polygon 570 is no greater than about 3 times the diameter 580 of the interlevel via 610. In the illustrated embodiment the polygon 570 is a square. The decoupling capacitor 500 is not limited to any particular shape, so the polygon 570 may be a shape other than a square. Typically, though, other shapes will result in such polygons that have smaller side lengths than does the polygon 570. The ratio of side length of such polygons to the interlevel via 610 will therefore typically be smaller than the ratio that results from the square polygon 570. For the purpose of the disclosure and the claims a circle or oval is considered a polygon with side length of zero.

When the size of the decoupling capacitor 500 is constrained as described the decoupling capacitor 500 may be constrained to be within a range of values. Because the spacing between the electrode fingers of the decoupling capacitor 500 decrease as the package substrate 160 design rules are scaled downward, the capacitance of the capacitor does not necessarily scale with the geometric scaling. In an embodiment of the present disclosure, the decoupling capacitor 500 is configured to have a capacitance density that falls within in a range from about 10 fF/$\mu m^2$ to about 100 fF/$\mu m^2$ for the line spacing as described previously with respect to the decoupling capacitor 200. It is expected that when the decoupling capacitor 500 has a capacitance density in this range, the capacitance density will remain within this range as the decoupling capacitor 500 is scaled. When the capacitance is in the stated range the decoupling capacitor 500 is expected to have a maximum extent, e.g. the side length 590, that is small enough that placement of multiple instances of the decoupling capacitor 500 will not significantly disrupt routing of power and ground signals on the package substrate 160.

In some cases the decoupling capacitor of the disclosure, e.g. the decoupling capacitor 200 or the decoupling capacitor 500, is implemented as a standard element of a library of standard elements. Such a standard element is referred to herein as an interdigitated capacitor library element. Interdigitated capacitors of the disclosure may be placed in a particular design to supplement existing on-chip or off-chip bypass capacitance. Such capacitors are expected to provide bypass capacitance with an RC time constant of 1 ns or less. Moreover, parasitic inductance of the capacitor is expected to be small, especially in embodiments for which one terminal of the capacitor is formed from a power or ground plane. Thus these capacitors are expected to act as low-pass filters with a −3 dB frequency greater than about 1 GHz.

The interdigitated capacitor library element will typically have an associated standard capacitance for a given design rule set. In some cases the library may include a small number of interdigitated capacitor library elements configured to provide different standard capacitance values. In various embodiments of the package substrate 160 a large number of interdigitated capacitors having a standard capacitance value is placed in a design layout of the package substrate 160. For example, the standard decoupling capacitor may be placed at a plurality of locations within the metal level 340 that are not used for signal routing, e.g. so-called "white space" in the design layout.

It is advantageous in some cases that each decoupling capacitor of the plurality of decoupling capacitors has a nominally identical area, for example to simplify layout algorithms. Typically smaller decoupling capacitors are easier to place, as a smaller unused area is needed to accommodate the capacitor. However, design overhead such as via landing pads related to connections to the decoupling capacitors increase design inefficiency. The nominal size of the decoupling capacitor in a particular design context may be determined by a balance of the larger overhead associated with placing smaller capacitors, and the difficulty of placing larger capacitors. It is thought that a standard capacitor having an area with a range of about 600E3 $\mu m^2$ to about 900E3 $\mu m^2$ represents an advantageous balance of the aforementioned constraints for a technology with a minimum line width and spacing of 20 $\mu m$. In some cases it is preferable that the area is less, such as to reduce interference with signal layouts. In some cases it is preferable that the area is greater, such as to reduce the area consumed by via landing pads.

Figure 7:
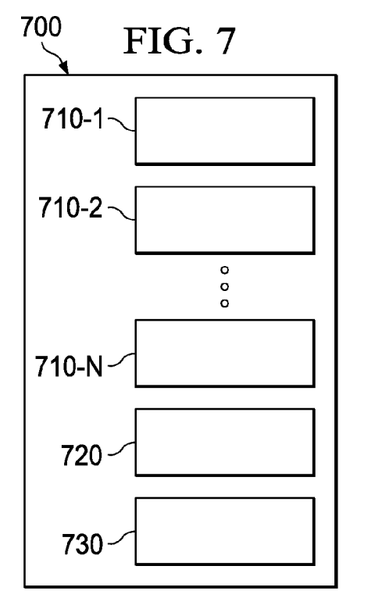
FIG. 7 illustrates a standard cell library that includes a design element that provides an interdigitated decoupling capacitor to an electronic device package substrate.

FIG. 7 illustrates a cell library 700 that includes standard decoupling capacitor elements 710-1, 710-2, . . . 710-n, as well as integrated circuit elements 720, 730 representative of other functional blocks that may be implemented in an electronic system design. The number of standard decoupling capacitor elements may in some cases be one, e.g. n=1. An automated design tool may employ the cell library 700 to place any number of instances of the capacitor elements 710-1, 710-2, . . . 710-n in the design of an electronic device package substrate such as the package substrate 160.

The cell library 700 may exist independent of the automated design tool that implements the logic elements provided by the cell library 700. Thus, the cell library 700 may be physically embodied by a storage medium such as a magnetic or optical disk, or semiconductor memory. The cell library 700 may also be transferred via a network from one storage medium to another. For the purposes of the disclosure and the claims any copy of the cell library 700 that is created by transmitting an electronic representation of the cell library 700 from one storage medium to another is regarded as another instance of the cell library 700.

Figure 8:
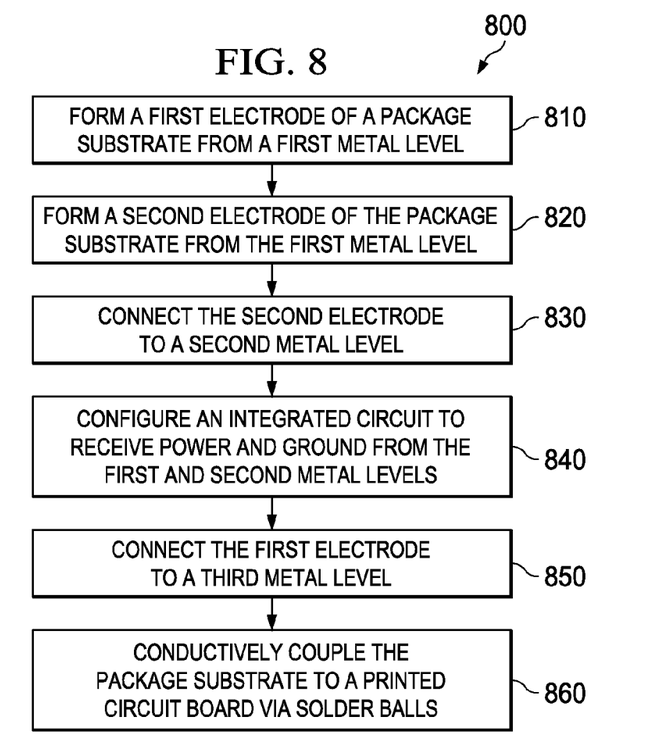
FIG. 8 is a method of forming an electronic device package.

Turning to FIG. 8, a method 800 of decoupling power on an integrated circuit device. The method 800 is described without limitation by reference to various embodiments described here, including the decoupling capacitors 200, 500. In a first step 810, a first electrode of a package substrate is formed, such as the first electrode 210. The first electrode includes fingers formed from a first metal level. The first electrode is configured to provide a first DC potential. In a step 820, a second electrode of the package substrate is formed, e.g. the second electrode 220. The second electrode includes fingers formed from the first metal level. The fingers of the first and second electrodes are interdigitated. In a step 830, the second electrode is connected to a second metal level. The second metal level is configured to provide a second DC potential. The connection of the second electrode to the second metal level causes the first and second DC potentials to be capacitively coupled through the interdigitated electrodes.

In an optional step 840, an integrated circuit die such as the device die 140 is configured to receive power and ground from the first and second metal levels. In an optional step 850 the first electrode is connected to a third metal level configured to provide the first DC potential. In an optional step 860 the package substrate is conductively coupled to a printed circuit board via solder balls. The printed circuit board is configured to provide power through the solder balls to one of the first and second electrodes and ground to the other of the first and second electrodes.

Those skilled in the art to which this application relates will appreciate that other and further additions, deletions, substitutions and modifications may be made to the described embodiments.

What is claimed is:

1. An electronic device package, comprising:
   a first electrode of a package substrate, said first electrode configured to operate at a first DC potential and having fingers formed from a first metal level located over a dielectric material layer of the package substrate;
   a second electrode of said package substrate having fingers formed from said first metal level, fingers of said first and second electrodes being interdigitated; and
   a via passing through said dielectric material layer to conductively connect said second electrode to a second metal level configured to operate at a second DC potential, thereby capacitively coupling said first and second DC potentials through said interdigitated electrodes.

2. The electronic device package as recited in claim 1, wherein said first DC potential is ground.

3. The electronic device package as recited in 1, wherein said interdigitated electrodes have an aspect ratio of at least about 1:1.

4. The electronic device package as recited in claim 1, wherein a capacitance between said first and second electrodes is in a range from about 10 fF/$\mu$m$^2$ to about 100 fF/$\mu$m$^2$.

5. The electronic device package as recited in claim 1, wherein said first electrode is connected to a third metal level configured to provide said first DC potential.

6. An electronic device package, comprising:
   a first electrode of a package substrate configured to operate at a first DC potential and having fingers formed from a first metal level;
   a second electrode of said package substrate having fingers formed from said first metal level, fingers of said first and second electrodes being interdigitated; and
   a via that conductively connects said second electrode to a second metal level configured to operate at a second DC potential, thereby capacitively coupling said first and second DC potentials through said interdigitated electrodes, and, further comprising an integrated circuit die attached to said package substrate, said die being configured to receive power and ground from said first and second metal levels.

7. An electronic device package, comprising:
   a first electrode of a package substrate configured to operate at a first DC potential and having fingers formed from a first metal level;
   a second electrode of said package substrate having fingers formed from said first metal level, fingers of said first and second electrodes being interdigitated; and
   a via that conductively connects said second electrode to a second metal level configured to operate at a second DC potential, thereby capacitively coupling said first and second DC potentials through said interdigitated electrodes, wherein said first metal level is located on a first dielectric material having a first dielectric constant, and a second dielectric layer having a second different dielectric constant is located between said first and second metal levels.

8. An electronic device package, comprising:
   a first electrode of a package substrate configured to operate at a first DC potential and having fingers formed from a first metal level;
   a second electrode of said package substrate having fingers formed from said first metal level, fingers of said first and second electrodes being interdigitated; and
   a via that conductively connects said second electrode to a second metal level configured to operate at a second DC potential, thereby capacitively coupling said first and second DC potentials through said interdigitated electrodes, wherein said first and second electrodes may be circumscribed by a polygon having a maximum side length no greater than about three times a diameter of said via.

9. An electronic device package, comprising:
   a first electrode of a package substrate configured to operate at a first DC potential and having fingers formed from a first metal level;
   a second electrode of said package substrate having fingers formed from said first metal level, fingers of said first and second electrodes being interdigitated; and
   a via that conductively connects said second electrode to a second metal level configured to operate at a second DC potential, thereby capacitively coupling said first and second DC potentials through said interdigitated electrodes, and, further comprising a printed circuit board electrically connected to said package substrate by way of solder balls, said printed circuit board being configured to provide power to one of said first and second electrodes and ground to the other of said first and second electrodes though said solder balls.

10. A method of decoupling power on an electronic device package, comprising:
    forming a first electrode of a package substrate, said first electrode having fingers formed from a first metal level located over a dielectric material layer of the package substrate, and configuring said first electrode to operate at a first DC potential;
    forming a second electrode of said package substrate having fingers formed from said first metal level, fingers of said first and second electrodes being interdigitated; and
    connecting said second electrode with a via formed through said dielectric material layer to a second metal level configured to operate at a second DC potential, thereby capacitively coupling said first and second DC potentials through said interdigitated electrodes.

11. The method as recited in claim 10, wherein said first DC potential is ground.

12. The method as recited in claim 10, wherein said interdigitated electrodes have an aspect ratio of at least about 1:1.

13. The method as recited in claim 10, wherein a capacitance between said first and second electrodes is in a range from about 10 fF/$\mu$m$^2$ to about 100 fF/$\mu$m$^2$.

14. The method as recited in claim 10, further comprising connecting said first electrode to a third metal level configured to provide said first DC potential.

15. A method of decoupling power on an electronic device package, comprising:
    forming a first electrode of a package substrate, said first electrode having fingers formed from a first metal level, and configuring said first electrode to operate at a first DC potential;
    forming a second electrode of said package substrate having fingers formed from said first metal level, fingers of said first and second electrodes being interdigitated; and connecting said second electrode with a via to a second metal level configured to operate at a second DC potential, thereby capacitively coupling said first and second DC potentials through said interdigitated electrodes, and, further comprising configuring an integrated circuit die to receive power and ground from said first and second metal levels.

16. A method of decoupling power on an electronic device package, comprising:.
   forming a first electrode of a package substrate, said first electrode having fingers formed from a first metal level, and configuring said first electrode to operate at a first DC potential;
   forming a second electrode of said package substrate having fingers formed from said first metal level, fingers of said first and second electrodes being interdigitated; and
   connecting said second electrode with a via to a second metal level configured to operate at a second DC potential, thereby capacitively coupling said first and second DC potentials through said interdigitated electrodes, wherein said first metal level is located on a first dielectric material having a first dielectric constant, and a second dielectric layer having a second different dielectric constant is located between said first and second metal levels.

17. A method of decoupling power on an electronic device package, comprising:
   forming a first electrode of a package substrate, said first electrode having fingers formed from a first metal level, and configuring said first electrode to operate at a first DC potential;
   forming a second electrode of said package substrate having fingers formed from said first metal level, fingers of said first and second electrodes being interdigitated; and
   connecting said second electrode with a via to a second metal level configured to operate at a second DC potential, thereby capacitively coupling said first and second DC potentials through said interdigitated electrodes, wherein said first and second electrodes may be circumscribed by a polygon having a maximum side length no greater than about three times a diameter of said via.

18. A method of decoupling power on an electronic device package, comprising:
   forming a first electrode of a package substrate, said first electrode having fingers formed from a first metal level, and configuring said first electrode to operate at a first DC potential;
   forming a second electrode of said package substrate having fingers formed from said first metal level, fingers of said first and second electrodes being interdigitated; and
   connecting said second electrode with a via to a second metal level configured to operate at a second DC potential, thereby capacitively coupling said first and second DC potentials through said interdigitated electrodes, further comprising conductively coupling said package substrate to a printed circuit board by way of solder balls, said printed circuit board being configured to provide power to one of said first and second electrodes and ground to the other of said first and second electrodes through said solder balls.

19. A library of standard elements for use in an electronic device package substrate, comprising:
   a standard element corresponding to a decoupling capacitor, including:
      a first electrode configured to operate at a first DC potential and having fingers formed from a first metal level located over a dielectric material layer of the electronic package substrate;
      a second electrode having fingers formed from said first metal level, fingers of said first and second electrodes being interdigitated; and
      a via passing through said dielectric material layer to conductively connect that conductively connects said second electrode to a second metal level configured to operate at a second DC potential.

20. The library as recited in claim 19, wherein said standard element further includes a second via that connects said first electrode to a third metal level configured to provide said first DC potential.

* * * * *